Oct. 24, 1950 A. J. FARINA 2,526,737
COMBINED GOGGLES AND DEFOGGING DEVICE
Filed April 8, 1948 2 Sheets-Sheet 2
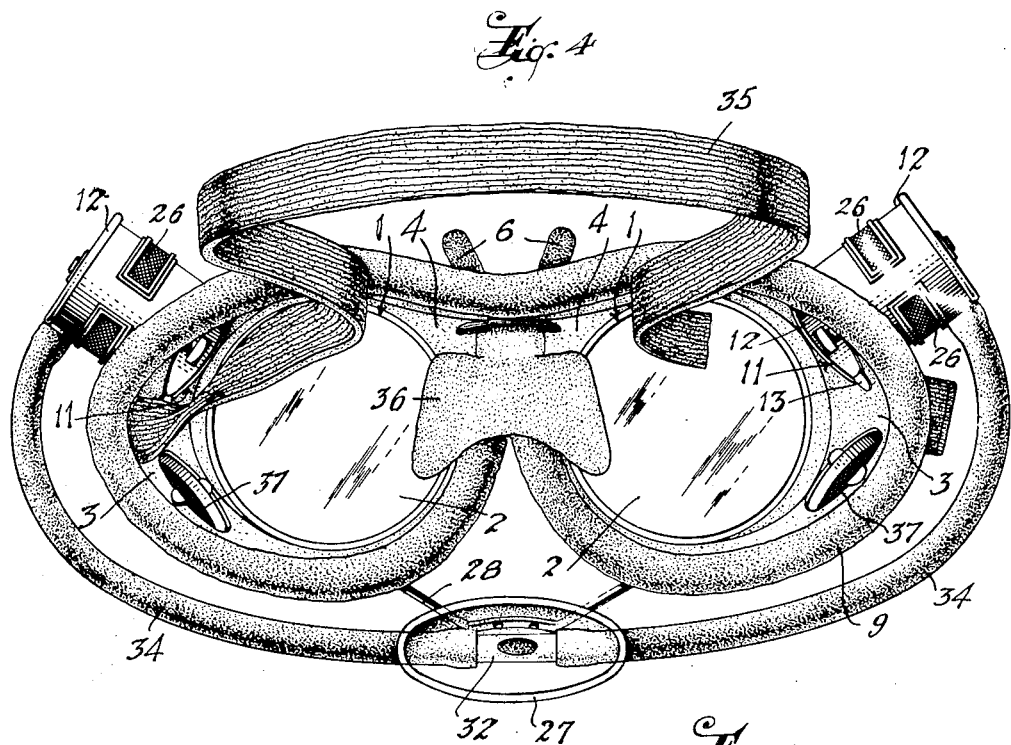
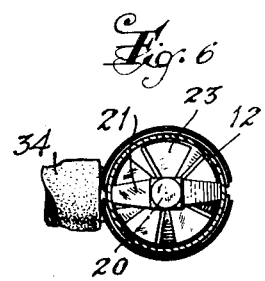
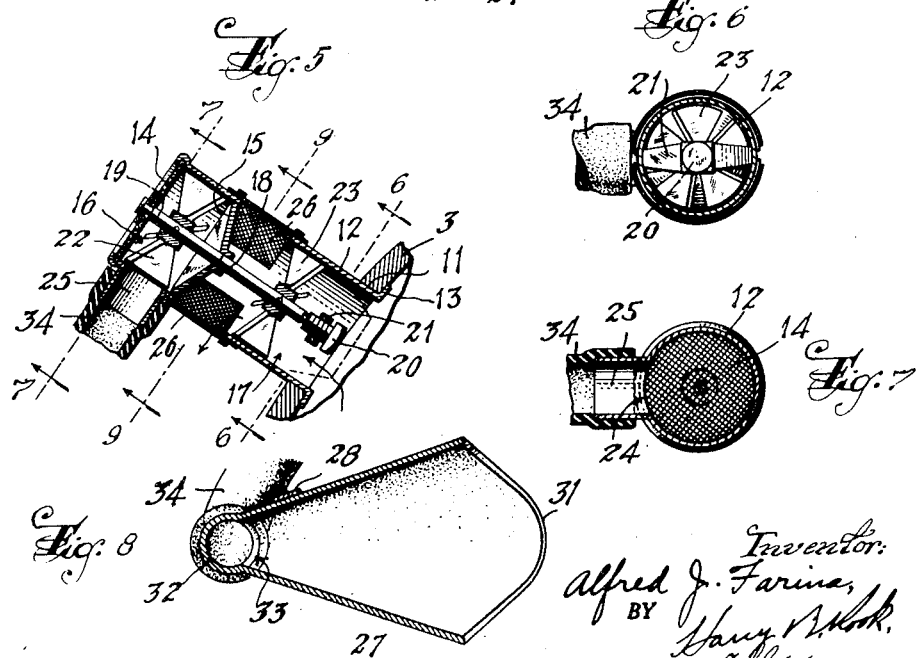
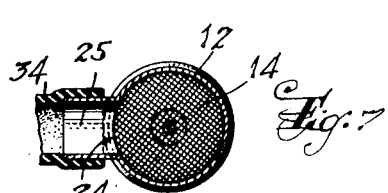
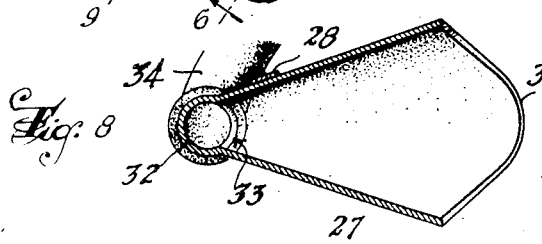

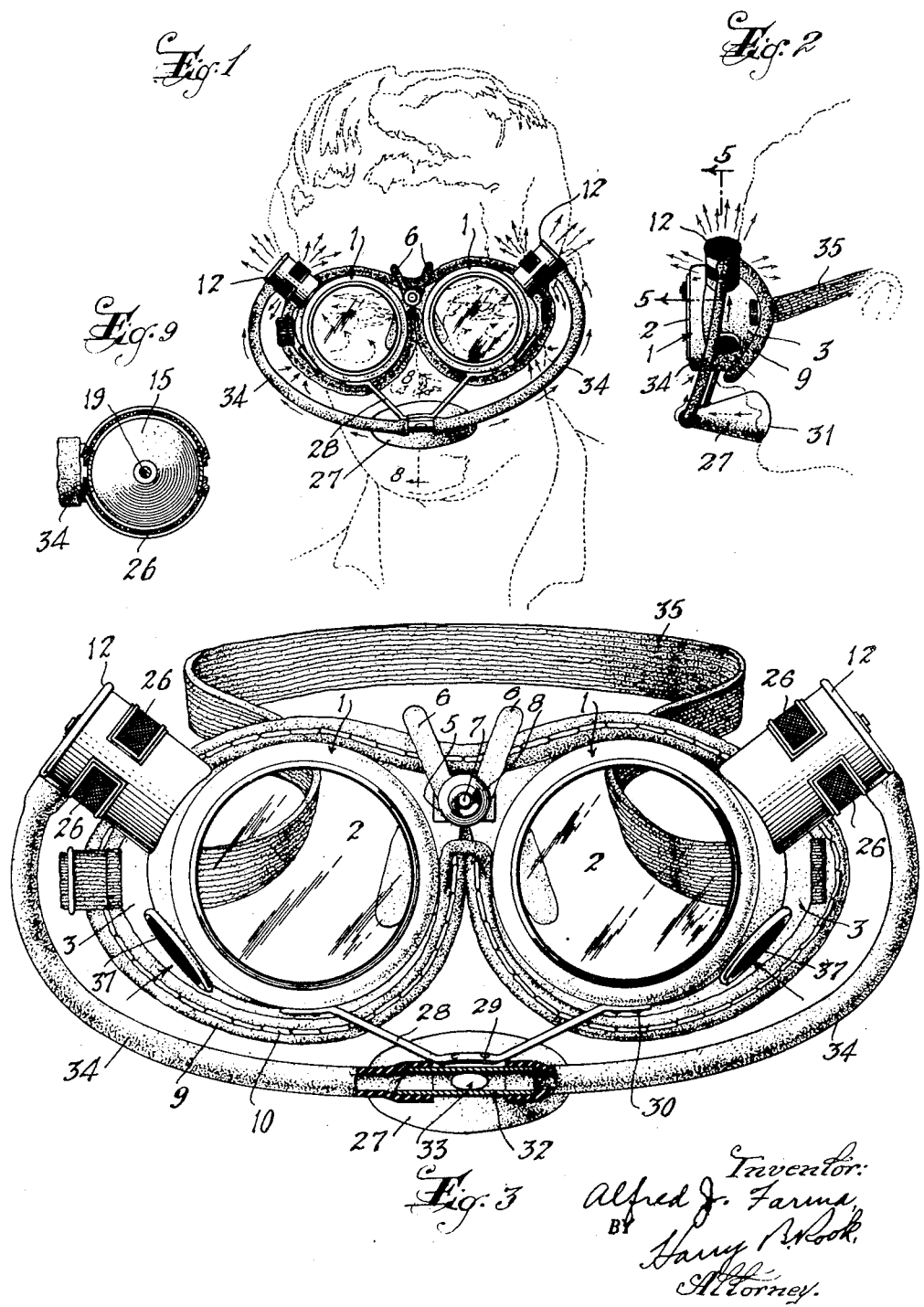

Patented Oct. 24, 1950

2,526,737

UNITED STATES PATENT OFFICE 2,526,737

COMBINED GOGGLES AND DEFOGGING DEVICE

Alfred Joseph Farina, New York, N. Y.

Application April 8, 1948, Serial No. 19,787

4 Claims. (Cl. 2—14.7)

1

This invention relates generally to goggles and a prime object of the present invention is to provide goggles with means for dispelling vapor about the eyes thus rendering the goggles nonfogging in character regardless of atmospheric conditions.

Another object is to provide goggles with means for circulating air over the inner faces of the lenses in order to prevent the formation of fog or moisture on the lenses.

A further object is to provide goggles that are simple and compact in construction and inexpensive to manufacture.

Other objects and advantages of the invention will be understood from the description thereof to follow taken in connection with the accompanying drawing in which—

Figure 1 is a front elevational view of goggles embodying my invention in position on a user's face.

Figure 2 is a side elevational view thereof.

Figure 3 is an enlarged front elevational view of the goggles shown in Figure 1, parts being broken away and parts being shown in section.

Figure 4 is an enlarged rear view of the goggles.

Figure 5 is an enlarged sectional detail view of the fan housing taken on the plane of the line 5—5 of Figure 2.

Figure 6 is a cross-sectional view taken on the plane of the line 6—6 of Figure 5.

Figure 7 is a cross-sectional view taken on the plane of the line 7—7 of Figure 5.

Figure 8 is an enlarged sectional detail view of the mouth piece taken on the plane of the line 8—8 of Figure 1.

Figure 9 is a cross-sectional view taken on the plane of the line 9—9 of Figure 5, parts being broken away.

Goggles made in accordance with the present invention comprise a pair of annular eye cups 1 formed of glass, plastic or other suitable material, the rear ends of which are shaped to fit over the eyes of a user. Each eye cup supports a lens 2 at its front end and is provided with a rearward extension 3 on its outer wall for fitting over the temple and with a lateral projection 4 on its inner wall adjacent the top thereof. The eye cups are adjustably connected by a strap which passes through aligned openings in the projections 4 and in a plate 5 mounted over the outer surface of the adjacent projections. The free ends 6 of the strap extend outwardly of the plate and on opposite sides of a screw threaded post 7 movably mounted in the center of the plate. A nut 8 on the outer end of the post

2 clamps the strap ends to the plate and holds the cups in adjusted position. The strap ends 6 are convenient to the fingers.

The inner edges of the eye cups and their projections 4 are covered by an endless soft rubber tubing 9 which may be secured to said edges by stitches 10 passing through said tubing and spaced holes in the edges of the cups and projections. This tubing serves as a cushion and adds to the comfort of the user.

The rearward extending portion 3 of each eye cup adjacent its top is formed with an opening 11. A hollow metal cylindrical housing 12 is mounted in said opening. The housing has an open inner end which is secured to the rearward extension 3 of the cup by flanging said inner end over the inner surface of said extension as indicated at 13. The outer end of the housing is closed by a screen 14. A transverse wall 15 divides the housing into an outer compartment 16 and an inner compartment 17. Wall 15 is formed with a central opening 18 for receiving a rotatable shaft 19 which extends through the housing and has an inner pin point bearing in the end of the shank of a screw 20 threaded into an opening in a cross-piece 21 extending across the interior of the inner compartment 17 adjacent its inner end. The outer end of the shaft has a bearing in the screen 14. Fastened to the shaft in the outer compartment 16 is a fan or blower 22 and fastened to the shaft in the inner compartment 17 is an exhaust fan 23. The side wall of the outer compartment 16 is provided with an opening 24 in alignment with the fan 22 and secured in the opening 24 is an inlet nipple 25. The side wall of the inner compartment 17 outwardly of the exhaust fan 23 is formed with aligned openings, each opening extending substantially one-half the circumference of the wall and being closed by a screen 26.

A mouth piece 27 is supported below and between the eye cups by the central portion of an elongated wire bracket 28 to which it is fastened by rivets 29 passing through said central portion and the wall of said mouth piece. The ends of the bracket are fastened to the eye cups by rivets 30. The mouth piece is made of glass or plastic and shaped like a hollow cone with its large flaring end 31 formed to fit over the mouth and with its small or apex end supporting an integral tube 32 which is disposed transversely of the axis of the conical body of the mouth piece. This tube is formed with an opening 33 communicating with the interior of the hollow body of the mouth piece. A rubber tube 34 connects one end of the mouth piece tube 32 with the inlet nipple 25 of an outer compartment 16.

In use, a head encircling elastic band 35 holds the eye cups and mouth piece in proper positions and a nose pad 36 may be secured in any suitable manner to the inner surfaces of the projections 4 for the comfort of the user. When it is desired to dispel or remove vapor or fog from the lenses, the user blows air through the mouth piece and tubes 32 and 34 into the outer compartments 16 of the housings 12 against the fans 22 thereby rotating said fans and connected shafts 19. Shafts 19 rotate the exhaust fans 23 in the inner compartments whereby the air and vapor is sucked out of the interior of each eye cup and into the inner compartment where it is discharged through the screened openings or outlets 26 to the exterior of the goggles. At the same time the air in the outer compartments 16 is blown out through the screens 14. Fresh air is admitted into the eye cups through screened inlets 37 formed in the walls of the eye cups below the openings 11.

Changes in details of construction might be made without departing from the principle of the invention and I desire to be limited only by the state of the prior art and the appended claims.

What I claim is:

1. Goggles comprising spaced annular eye cups with each having a fresh air inlet, each of said eye cups having an opening in its side wall, a lens supported by each of said cups, a separate hollow cylindrical housing supported on each of said eye cups and communicating with the opening in the side wall thereof, an inlet in each of said housings, a blower fan in the outer end of said housing in line with the inlet therein, an exhaust fan in the inner end of each housing operatively connected to the blower fan therein, exits for each of said housings a mouth piece anchored to said eye cups midway and below them and having oppositely disposed side openings and flexible tubes connecting said side openings with the inlets in said housings so air from the mouthpiece is directed to the blower fans therein for rotating them as well as the exhaust fans to draw fresh air through said side inlets and over the inner surfaces of the lenses and out through the exit for the exhaust fan.

2. Goggles comprising spaced eye cups with each having a screened side air inlet, each of said eye cups also having an opening in its side wall, a lens supported by each of said cups, a separate hollow cylindrical housing communicating with each of said openings, a transverse wall in each of said housings providing an outer compartment and an inner compartment therein, said wall having a central opening, an inlet and a screened outlet formed in each of said outer compartments, an outlet preferably screened in the inner compartment a rotatable shaft extending through said central opening and into the compartments of each of said housings, a blower fan fixed to each shaft in the outer compartment, an exhaust fan fixed to each shaft in the inner compartment, a mouth piece supported from and below and between said eye cups, said mouth piece having side openings and tubes connecting said side openings with said inlets whereby air is directed to the blower fans for rotating said shafts while said exhaust fans will draw fresh air through said fresh air inlets and over the lens and through said inner compartment to dispel vapor from the inner surfaces of the lenses.

3. Goggles comprising spaced eye cups with each having a fresh air inlet, each of said eye cups also having an opening in its side wall, a lens supported by each of said cups, a separate hollow cylindrical housing communicating with each of said openings, a transverse wall in each of said housings providing an outer compartment and an inner compartment therein, said wall having a central opening, an inlet and an outlet formed in each of said outer compartments, opposed outlets in each of said inner compartments, a rotatable shaft extending through said central opening and into the compartments of each of said housings, a blower fan fixed to each shaft in the outer compartment in line with the inlet therein, an exhaust fan fixed to each shaft in the inner compartment of the housing inwardly of the opposed outlets therein, a mouth piece supported by said eye cups and having an open ended tubular member and tubes connecting the ends of said tubular member with said inlets in the outer compartments whereby air is directed to the blower fans for rotating said shafts while said exhaust fans will draw fresh air through said fresh air inlets and over the lens and through said inner compartment to dispel vapor from the inner surfaces of the lenses.

4. Eye goggles comprising a pair of spaced cups each carrying a lens, strap means for adjustably connecting said cups, each of said cups having an opening in its outside wall, a hollow cylindrical housing positioned in each of said openings and extending outwardly from the cups, said housing being divided by a transverse wall into two separate chambers, a shaft at least partially supported by said wall and extending into both of said chambers, the inner one of which opens at one end into its associated cup with an exit adjacent said wall, said chamber having an exhaust fan therein carried by said shaft, a blower fan carried by the shaft in the outer chamber which has an exit for cooperation with said blower fan, a mouthpiece supported from and below said cups and having a pipe connection with each of the blower chambers, and a fresh air intake for each cup to allow its exhaust fan to pull fresh air into the cup and over the inner surface of its lens for the purpose described.

ALFRED JOSEPH FARINA.

REFERENCES CITED

The following references are of record in the file of this patent:

UNITED STATES PATENTS

| Number | Name | Date |
|---|---|---|
| 533,854 | Loeb | Feb. 5, 1895 |
| 652,080 | Chappell | June 19, 1900 |

FOREIGN PATENTS

| Number | Country | Date |
|---|---|---|
| 145,637 | Germany | Nov. 2, 1903 |